(12) United States Patent
Oshima et al.

(10) Patent No.: US 6,367,994 B2
(45) Date of Patent: *Apr. 9, 2002

(54) POWER TRANSMISSION SWITCHING DEVICE, ROCKING LEVER LOCKING DEVICE IN POWER TRANSMISSION SWITCHING DEVICE AND POWER TRANSMISSION SWITCHING DEVICE-APPLIED RECORDING APPARATUS

(75) Inventors: Keiich Oshima; Kiyoto Komuro; Etsuo Tsuji; Koichiro Yokoyama, all of Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/480,662

(22) Filed: Jan. 11, 2000

(30) Foreign Application Priority Data

| Jan. 11, 1999 | (JP) | 11-004327 |
| Jan. 11, 1999 | (JP) | 11-004482 |
| Mar. 25, 1999 | (JP) | 11-080830 |
| Sep. 30, 1999 | (JP) | 11-278733 |
| Sep. 30, 1999 | (JP) | 11-278738 |

(51) Int. Cl.$^7$ ............................................. B41J 23/34
(52) U.S. Cl. ..................... 400/185; 400/186; 400/187; 400/371
(58) Field of Search ................................ 400/184, 185, 400/186, 187, 365, 370, 371

(56) References Cited

U.S. PATENT DOCUMENTS

| 4,752,786 A | * | 6/1988 | Inoue et al. ............. 400/185 X |
| 4,822,186 A | * | 4/1989 | Hanaoka et al. ........ 400/185 X |
| 4,866,531 A | * | 9/1989 | Kobori et al. ............... 358/400 |
| 5,106,216 A | | 4/1992 | Kim ........................... 400/185 |
| 5,206,737 A | * | 4/1993 | Sugiyama ............... 400/185 X |
| 5,226,743 A | * | 7/1993 | Jackson et al. ......... 400/185 X |
| 5,733,055 A | | 3/1998 | Hiramatsu et al. .......... 400/355 |

FOREIGN PATENT DOCUMENTS

| DE | 37 32 853 A1 | 4/1989 | ............ B41J/32/00 |
| EP | 0 505 969 A2 | 9/1992 | ............ B41J/13/00 |
| EP | 0 659 571 A2 | 6/1995 | ............ B41J/13/00 |
| JP | 61-099741 | 5/1986 | |
| JP | 9-169121 | 6/1997 | ............ B41J/2/175 |
| JP | 10-129057 | 5/1998 | ............ B41J/13/00 |
| JP | 10-129895 | 5/1998 | ............ B65H/9/14 |

* cited by examiner

*Primary Examiner*—John S. Hilten
*Assistant Examiner*—Minh H. Chau
(74) *Attorney, Agent, or Firm*—Sughrue Mion, PLLC

(57) ABSTRACT

A mechanism for selectively switching two drive transmission systems by one driving source is provided and a rocking lever which can be rocked between a first drive transmission gear of a first drive transmission system and a first drive transmission gear of a second drive transmission system respectively located on both sides of a drive shaft is provided. A rocking gear located between both drive transmission gears and selectively engaged with both drive transmission gears for transmitting driving force from the driving source is attached to the rocking lever and a locking means mocks the rocking lever in a state that the locking means is engaged with either of the both drive transmission gears. The first drive transmission system and the second drive transmission system are connected to a drive unit normally and reversely rotated. At least one flat side is formed in the above locking means and a flat side which can come in contact with the flat side of the locking means is formed in a fitting part. A secure lock can be realized by touching these both sides in locking.

26 Claims, 12 Drawing Sheets

+ : DIRECTION WHERE PLANET GEAR IS MOVED TO SIDE OF PUMP TRANSMISSION GEAR
− : DIRECTION WHERE PLANET GEAR IS MOVED TO SIDE OF ASF TRANSMISSION GEAR

POWER TRANSMISSION SWITCHING DEVICE, ROCKING LEVER LOCKING DEVICE IN POWER TRANSMISSION SWITCHING DEVICE AND POWER TRANSMISSION SWITCHING DEVICE-APPLIED RECORDING APPARATUS

BACKGROUND OF INVENTION

1. Field of Invention

The present invention relates to a power transmission switching device for selectively switching two drive transmission systems and transmitting driving force from one driving source to the selected drive transmission system, a locking device for securely locking the engagement of gears in the selected drive transmission system in the power transmission switching device and a recording apparatus provided with the power transmission switching device for individually driving the two drive transmission systems by one driving source.

2. Related Art

If the driving force of one driving source such as a motor is individually transmitted to two driven systems and utilized, a power transmission switching device may be provided halfway to the driven systems to switch the transmission of the driving force.

For a conventional type example of such a power transmission switching device, as disclosed in Japanese published unexamined patent application Hei.9-169121 for example, there is structure that a driving gear having a long dimension in an axial direction is provided on the side of a driving source, a first driven gear and a second driven gear respectively connected to different drive units are provided on the side of driven transmission mechanisms and further, a slide gear which is always engaged with the driving gear and can be slid in the axial direction of the driving gear is provided between the driving gear and the first driven gear or the second driven gear. In such structure, when the slide gear is located on the one side in the axial direction of the driving gear, driving force is transmitted to the first driven gear, when the slide gear is slid to the other side in the axial direction of the driving gear, driving force is transmitted to the second driven gear and the transmission of a drive to the first driven gear is disconnected.

Also, for another conventional type example of the power transmission switching device, there is structure that a gear train for a paper supply roller of a printer and a gear train for a paper feeding roller are switched by a switching device as disclosed in Japanese published unexamined patent applications Hei. 10-129057 and Hei. 10-129895. The above switching device operates a switching lever utilizing the movement of a carriage to a home position to execute the connection and the release of the connection of gear trains.

However, in a mechanism provided with the former slide gear, there is a problem that as a fixed or longer dimension in a direction in which the slide gear is slid is required, a compact power transmission switching device cannot be realized and the whole switching device is large-sized.

Also, in the latter switching device, as the movement of a carriage to a home position operates a switching lever, throughput is extended by time when the carriage is moved. There is a problem that as structure that the carriage presses the switching lever to slide a gear is adopted, the structure is complicated and the switching device is thickened in a direction in which the gear is slid.

To solve these problems, the adoption of a planet gear which can be selectively engaged with each drive transmission gear of two drive transmission systems is conceivable. However, in this case, when the planet gear is normally and reversely rotated in a state that it is engaged with either of the two drive transmission gears, gears are sometimes separated and a situation that all teeth are not engaged occurs unless a rocking lever is tightly fixed in a state that the planet gear is engaged with the drive transmission gear.

A first object of the present invention is to provide a power transmission switching device provided with relatively simple and compact structure including a mechanism for selectively switching two power transmission systems by one driving source.

A second object of the present invention is to provide a rocking lever locking device for tightly locking the rocking lever in a state that a planet gear is engaged with either of two drive transmission gears in a power transmission switching device.

A third object of the present invention is to provide a miniaturized recording apparatus including a power transmission switching device the structure of which is simple and compact for individually driving two drive transmission systems by one driving source.

SUMMARY OF THE INVENTION

To achieve the above objects, according to a first aspect of the present invention, a power transmission switching device provided with a mechanism for selectively switching two drive transmission systems connected to one driving source and comprising a first drive transmission gear of a first drive transmission system, a first drive transmission gear of a second drive transmission system, a rocking lever which can be rocked between the first drive transmission gear of the first drive transmission system and the first drive transmission gear of the second drive transmission system, a planet gear attached to the rocking lever, located between the above both drive transmission gears and selectively engaged with the above both drive transmission gears by the rock of the rocking lever for transmitting driving force from the driving source and locking means for locking the rocking lever in a state that the planet gear is engaged with either of the two drive transmission gears wherein the first drive transmission gear of the first drive transmission system and the first drive transmission gear of the second drive transmission system are located on both sides of the drive shaft of the driving source and the first and second drive transmission systems are connected to a drive unit normally and reversely rotated is provided.

According to the above configuration, driving force from the driving source can be selectively transmitted to the first and second drive transmission systems by rolling the planet gear between the first drive transmission gear of the first drive transmission system and the first drive transmission gear of the second drive transmission system. If the planet gear is rotated clockwise and counterclockwise, that is, if it is normally and reversely rotated, the planet gear is also never separated from the first drive transmission gear of each drive transmission system by locking the rocking lever by the above locking means. Therefore, gears are prevented from being separated and a situation that all teeth are not engaged is prevented from occurring.

Also, according to another aspect of the present invention, another power transmission switching device provided with a mechanism for selectively switching two drive transmission systems connected to one driving source and comprising a first drive transmission gear of a first drive transmission system, a first drive transmission gear of a second drive transmission system, a rocking lever which can be rocked between the first drive transmission gear of the first drive transmission system and the first drive transmission gear of the second drive transmission system, a planet gear attached to the rocking lever, located between the above both drive transmission gears, rolled on a locus between the above both drive transmission gears and selectively engaged with the both drive transmission gears by the rock of the rocking lever for transmitting driving force from the driving source and rocking lever holding means for advancing or backing the rocking lever on the above locus to regulate the above roll of the planet gear in a state that the planet gear is engaged with either of the two drive transmission gears wherein the first drive transmission gear of the first drive transmission system and the first drive transmission gear of the second drive transmission system are located on both sides of the drive shaft of the driving source and the first and second drive transmission systems are connected to a drive unit normally and reversely rotated is provided.

According to the above configuration, the similar action and effect are also acquired. The rocking lever locking means disclosed in Claim 1 and the rocking lever holding means disclosed in Claim 2 can respectively execute the above locking operation and the above operation for an advance and backing both in a direction along the rocked face (the rolled face) of the rocking lever and in a direction perpendicular to the above direction. In either direction, only the displacement of the planet gear on the rocked face of the rocking lever and the rocking lever occurs.

Also, according to another aspect of the present invention, in the above power transmission switching device, the above rocking lever is supported by a shaft which is the same or parallel as/to the above drive shaft so that the rocking lever can be rocked and has a peripheral margin equivalent to a part of a circumference, and the above locking means or the rocking lever holding means can be fitted to a part of the peripheral margin of the rocking lever in a state that the above planet gear is engaged with either of the above two drive transmission gears to regulate the rock of the rocking lever.

According to the above configuration, the rocking lever is supported by a shaft which is the same or parallel as/to the drive shaft so that the rocking lever can be rocked and as the rocking lever is rocked, the peripheral margin of the planet gear is moved, drawing an arc-shaped locus. The above locking means or the rocking lever holding means is fitted to a part of the peripheral margin on the way of a locus of the movement on the peripheral margin in a state that the planet gear is engaged with either of the two drive transmission gears and locks the position of the planet gear attached to the rocking lever.

Also, according to another aspect of the present invention, in the above power transmission switching device, the above rocking lever is supported by a shaft which is the same or parallel as/to the above drive shaft so that the rocking lever can be rocked, its free end functions as a fitting part, and the above locking means or the rocking lever holding means is fitted to the above fitting part in a state that the planet gear is engaged with either of the two drive transmission gears to regulate the rock of the rocking lever.

In this aspect, the structure of the rocking lever is different from that disclosed in Claim 3, however, the action and effect are common.

Also, according to another aspect of the present invention, the above power transmission switching device is further provided with a sun gear engaged with the drive shaft of the driving source and the planet gear revolves around a part of the periphery of the sun gear.

According to the above configuration, the sun gear is rotated by the rotation of the drive shaft and as the sun gear is rotated, the planet gear revolves around the sun gear until the planet gear is engaged with the first drive transmission gear of one drive transmission system. Also similarly, the planet gear revolves around the sun gear in the reverse direction by reversely rotating the drive shaft until the planet gear is engaged with the first drive transmission gear of the other drive transmission system.

Also, according to another aspect of the present invention, in the above power transmission switching device, the above first drive transmission system is connected to a pump for discharging ink from an ink storage tank for jetting power recovery operation of an ink-jet printer. According to the above configuration, when the first drive transmission gear of the first drive transmission system is normally rotated, the pump sucks ink and when the first drive transmission gear is reversely rotated, the operation for sucking ink of the pump is stopped or the crush of a tube built in the pump by a pressing ember can be released.

Also, according to another aspect of the present invention, in the above power transmission switching device, the above second drive transmission system is connected to a paper feeding roller of a printer. According to the above configuration, the normal rotation and the reverse rotation of the paper feeding roller of a printer can be controlled and a state in which paper is fed can be precisely adjusted.

Also, according to another aspect of the present invention, the above driving source, at least the first drive transmission gear of the above first drive transmission system, at least the first drive transmission gear of the above second drive transmission system, the above rocking lever, the above planet gear and the above locking means or the above rocking lever holding means are united. According to the above configuration, assembly work is completed in a short time only by building the united members as they are in a device for the power transmission switching device to be built.

Also, a rocking lever locking device in another aspect of the present invention in a power transmission switching device comprising one driving source, a mechanism for selectively switching the two first and second drive transmission systems respectively connected to the above driving source, a first drive transmission gear of a first drive transmission system, a first drive transmission gear of a second drive transmission system, a rocking lever which can be rocked between the first drive transmission gear of the first drive transmission system and the first drive transmission gear of the second drive transmission system, a planet gear attached to the rocking lever, located between the above both drive transmission gears, rolled on a locus between the both drive transmission gears and selectively engaged with the both drive transmission gears by the rock of the rocking lever for transmitting driving force from the driving source and locking means for regulating the roll of the rocking lever in a state that the planet gear is engaged with either of the two drive transmission gears wherein the first drive transmission gear of the first drive transmission system and the first drive transmission gear of the second drive transmission system are located on both sides of the drive shaft of the driving source, the above locking means backs on a locus on which the rocking lever is rocked and regulates the roll of the planet gear and the first and second drive transmission systems are connected to a drive unit normally and reversely rotated is provided.

According to the above configuration, as the above locking means backs on a locus on which the rocking lever is rocked and regulates the roll of the planet gear, the structure is simplified and unnecessary roll can be securely prevented in a state that the planet gear is engaged with either of the two drive transmission gears. Therefore, even if the first and second drive transmission systems are connected to a drive unit normally and reversely rotated, gears are prevented from being separated and a situation that all teeth are not engaged is prevented from occurring.

Also, according to another aspect of the present invention, in the above rocking lever locking device, a fitted part is formed in the above rocking lever, at least one flat side is formed in a fitting part fitted to the above fitted part of the above locking means and a flat side which can come in contact with the above flat side is formed in the fitted part of the rocking lever.

According to the above configuration, the flat side of the fitting part formed in the above locking means comes in contact with the flat side of the fitted part and securely locks the rock of the rocking lever.

Also, according to another aspect of the present invention, in the above rocking lever locking device, each fitted part is formed at both ends of the peripheral margin of the rocking lever and two opposite flat sides which can come in contact with the flat side of each fitted part are formed in the fitting part of the locking means.

According to the above configuration, when the rocking lever is rocked on the left side, the whole flat side on the left side of the fitting part of the locking means comes in contact with the flat side of the fitted part on the right side and locks it and when the rocking lever is rocked on the right side, the whole flat side on the right side of the fitting part of the locking means comes in contact with the flat side of the fitted part on the left side and locks it.

Also, according to another aspect of the present invention, in the above rocking lever locking device, a flat lower surface is formed in the fitting part of the above locking means and a fitted surface which can come in contact with the lower surface of the fitting part is formed in the above fitted part.

According to the above configuration, the above locking means is fitted into the fitted part by touching the flat lower surface of the fitting part of the locking means to the fitted surface of the fitted part and a securer lock can be realized.

Also, according to another aspect of the present invention, in the above rocking lever locking device, the above rocking lever is supported by a shaft which is the same or parallel as/to the above drive shaft so that the rocking lever can be rocked and the peripheral margin of the rocking lever is formed in the shape of an arc.

According to the above configuration, when the rocking lever is rocked, the lower end of the fitting part of the above locking means is guided along the peripheral margin of the rocking lever and when the position of the locking means and the position of the fitted part are registered, the locking means automatically enters the fitted part and is fitted into the fitted part.

Also, according to another aspect of the present invention, in the above rocking lever locking device, the fitting part of the above locking means is always pressed on the side of the fitted part and the released of the fitting of the fitting part from the fitted part is operated by a solenoid.

According to the above configuration, as the above locking means always tries to continue to be fitted into the fitted part, a securer locked state can be realized and the locked state can be released by operating the solenoid only when necessary.

Also, according to another aspect of the present invention, in the above rocking lever locking device, the above rocking lever is supported by a shaft which is the same or parallel as/to the above drive shaft so that the rocking lever can be rocked, its free end functions as a fitting part and the above locking means can be fitted into the fitted part in a state that the above planet gear is engaged with either of the above two drive transmission gears to regulate the rock of the rocking lever.

According to the above configuration, substantially the similar act and effect to those in the present invention disclosed in claim 10 are acquired.

Also, according to another aspect of the present invention, in the above rocking lever locking device, the above locking means is provided with a lock pin which can be advanced and backed in a direction perpendicular to a direction in which the rocking lever is rocked by external force and is formed so that the roll of the rocking lever is regulated by the above advance and backing of the lock pin in a state that the above planet gear is engaged with either of the above two drive transmission gears.

According to the above configuration, in the case of structure that the rocking lever is locked and the lock is released utilizing the movement of the carriage of a printer to a home position, no problem of large size in a conventional type occurs because the planet gear and others are located on the rocked surface and unchanged even if the lock pin is moved in the same direction as the carriage.

Also, a recording apparatus in another aspect of the present invention provided with a power transmission switching device for individually driving two driven units by one driving source comprising a first drive transmission gear of a first drive transmission system, a first drive transmission gear of a second drive transmission system, a switching member which can be rocked between the first drive transmission gear of the first drive transmission system and the first drive transmission gear of the second drive transmission system, a rocking gear attached to the switching member, located between the above both drive transmission gears and individually engaged with the first and second drive transmission gears by the rock of the switching member for transmitting driving force from the driving source and locking means for locking the switching member in a state that the rocking gear is engaged with either of the first and second drive transmission gears wherein the first drive transmission gear of the first drive transmission system and the first drive transmission gear of the second drive transmission system are located on both sides of the drive shaft of the driving source and the first and second drive transmission systems are respectively connected to two driven units normally and reversely rotated is provided.

According to the above configuration, driving force from the driving source can be individually transmitted to the first drive transmission system and the second drive transmission system by rocking the rocking gear between the first drive transmission gear of the first drive transmission system and the first drive transmission gear of the second drive transmission system. Hereby, the structure of the power transmission switching device for individually driving two driven units by one driving source can be simplified and made compact and the whole recording apparatus can be miniaturized. Further, the switching member is never separated from the first drive transmission gear of each drive transmission system by locking the switching member by the locking means even if the rocking gear is rotated clockwise and counterclockwise, that is, is normally and reversely rotated. Therefore, a recording apparatus free of separation between gears and disengagement can be realized.

Also, according to another aspect of the present invention, in the above recording apparatus, the above switching member can be rocked using the base on the side of the above drive shaft as a fulcrum, has a part of a circumference as its peripheral margin and the above locking means can be fitted into a part of the peripheral margin of the switching member. According to the above configuration, as the side of the free end of the switching member is rocked using the base on the side of the drive shaft as a fulcrum, the peripheral margin of the rocking gear moves, drawing an arc-shaped locus. The above locking means is fitted into a part of the peripheral margin on the way of the locus on which the peripheral margin moves and locks the position of the rocking gear attached to the switching member.

Also, according to another aspect of the present invention, in the above recording apparatus, the above power transmission switching device is provided with a sun gear engaged with the drive shaft of the above driving source and the above rocking gear is a planet gear which revolves around a part of the periphery of the sun gear. According to the above configuration, the sun gear is rotated by the rotation of the drive shaft and as the sun gear is rotated, the rocking gear revolves around the sun gear as a planet gear until the rocking gear is engaged with the first drive transmission gear of one drive transmission system. Also similarly, the rocking gear revolves around the sun gear in a reverse direction by reversely rotating the drive shaft until the rocking gear is engaged with the first drive transmission gear of the other drive transmission system. Hereby, power transmission from one driving source can be securely switched to two driven units.

Also, according to another aspect of the present invention, in the above recording apparatus, the above first drive transmission system is connected to a pump for discharging ink from an ink storage tank for jetting power recovery operation of an ink-jet printer. According to the above configuration, when the first drive transmission gear of the first drive transmission system is normally rotated for example, the pump sucks ink and when the first drive transmission gear is reversely rotated, the sucking operation of the pump is stopped or the crush of a tube built in the pump by a pressing member can be released. Hereby, trouble by the crush of the tube in the above recording apparatus can be prevented from being caused.

Also, according to another aspect of the present invention, in the above recording apparatus, the second drive transmission system is connected to a paper feeding roller of a printer. According to the above configuration, the normal rotation and the reverse rotation of the paper feeding roller of a printer can be controlled and hereby, a paper fed state in the above recording apparatus can be precisely adjusted.

Also, according to another aspect of the present invention, in the above recording apparatus, the above locking means is constituted so that it can be fitted into a fitted part formed in the above switching member, at least one flat side is formed in the locking means and a flat side which can come in contact with the flat side of the locking means is formed in the fitted part of the switching member. According to the above configuration, the whole flat side of the above locking means comes in contact with the flat side of the fitted part and can securely lock the rock of the switching member.

Hereby, certainty in switching power transmission in the above recording apparatus can be enhanced.

Also, according to another aspect of the present invention, in the above recording apparatus, each fitted part is formed at both ends of the peripheral margin of the above switching member and two opposite flat sides which can respectively come in contact with the flat side of each fitted part are formed in the above locking means. According to the above configuration, when the switching member is rocked on the left side, the whole flat side on the left side of the above locking means comes in contact with the flat side of the fitted part on the right side and locks it, when the switching member is rocked on the right side, the whole flat side on the right side of the locking means comes in contact with the flat side of the fitted part on the left side and locks it.

Also, according to another aspect of the present invention, in the above recording apparatus, a flat lower surface is formed in the above locking means and a fitted surface which can come in contact with the lower surface of the above locking means is formed in the above fitted part. According to the above configuration, when the flat lower surface of the above locking means comes in contact with the fitted surface of the fitted part, the locking means is fitted into the fitted part and a securer lock can be realized.

Also, according to another aspect of the present invention, in the above recording apparatus, the above locking means is always pressed on the side of the fitted part and the release of the fitting of the locking means from the fitted part is operated by a solenoid. According to the above configuration, as the above locking means always tries to continue to be fitted into the fitted part, a securer lock can be realized, only if necessary, the solenoid is operated and locking can be released.

Also, according to another aspect of the present invention, in the above recording apparatus, the above driving source, at least the first drive transmission gear of the above first drive transmission system, at least the first drive transmission gear of the above second drive transmission system, the above switching member, the above rocking gear, the above sun gear and the above locking means are united to be the above power transmission switching device. According to the above configuration, assembly work is completed in a short time by only assembling the united power transmission switching device as it is in the recording apparatus.

DETAILED DESCRIPTION OF THE INVENTION

First Embodiment

Figure 1:
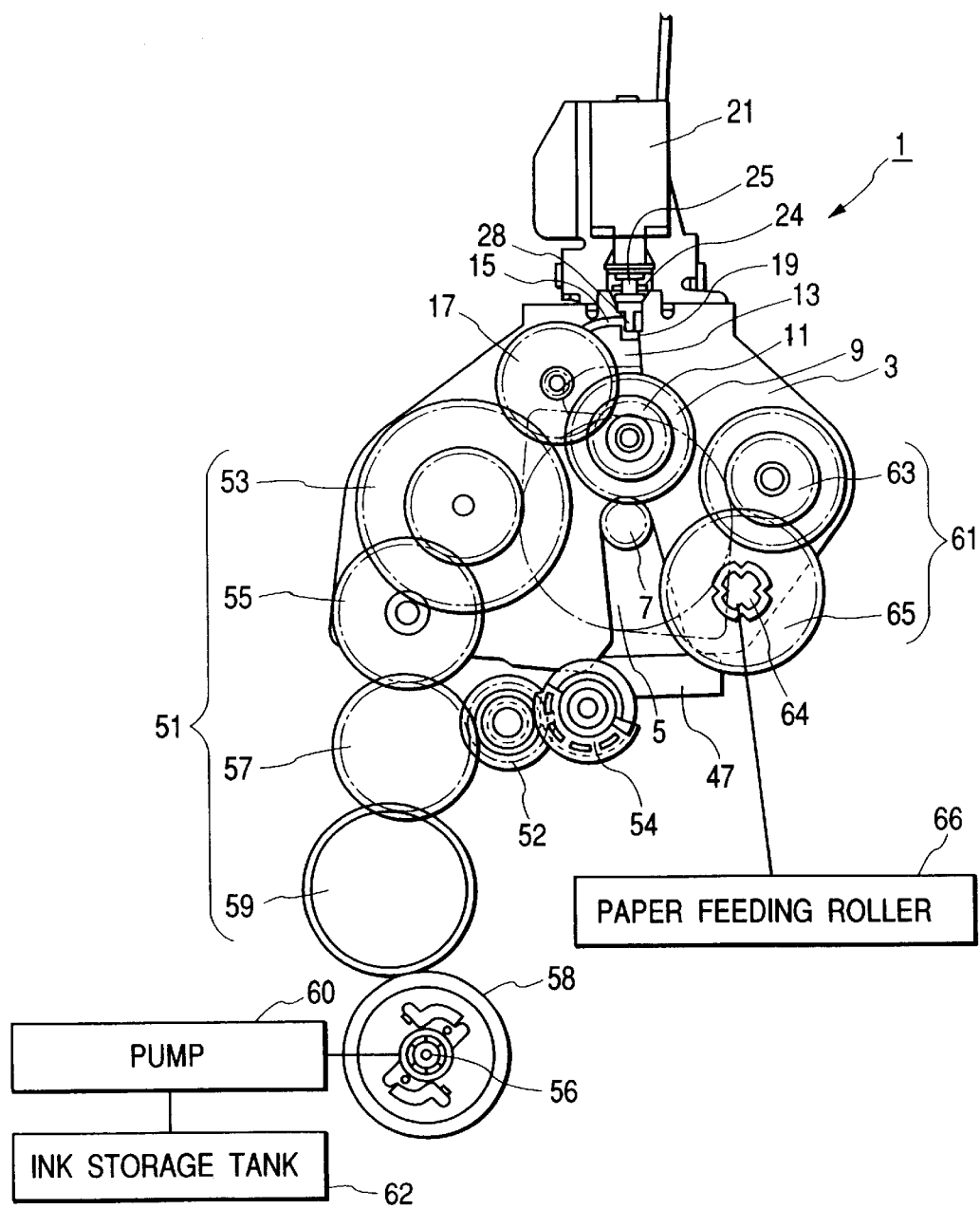
FIG. 1 is a front view showing a state that a power transmission switching device according to the present invention is connected to a first drive transmission system.
Figure 2:
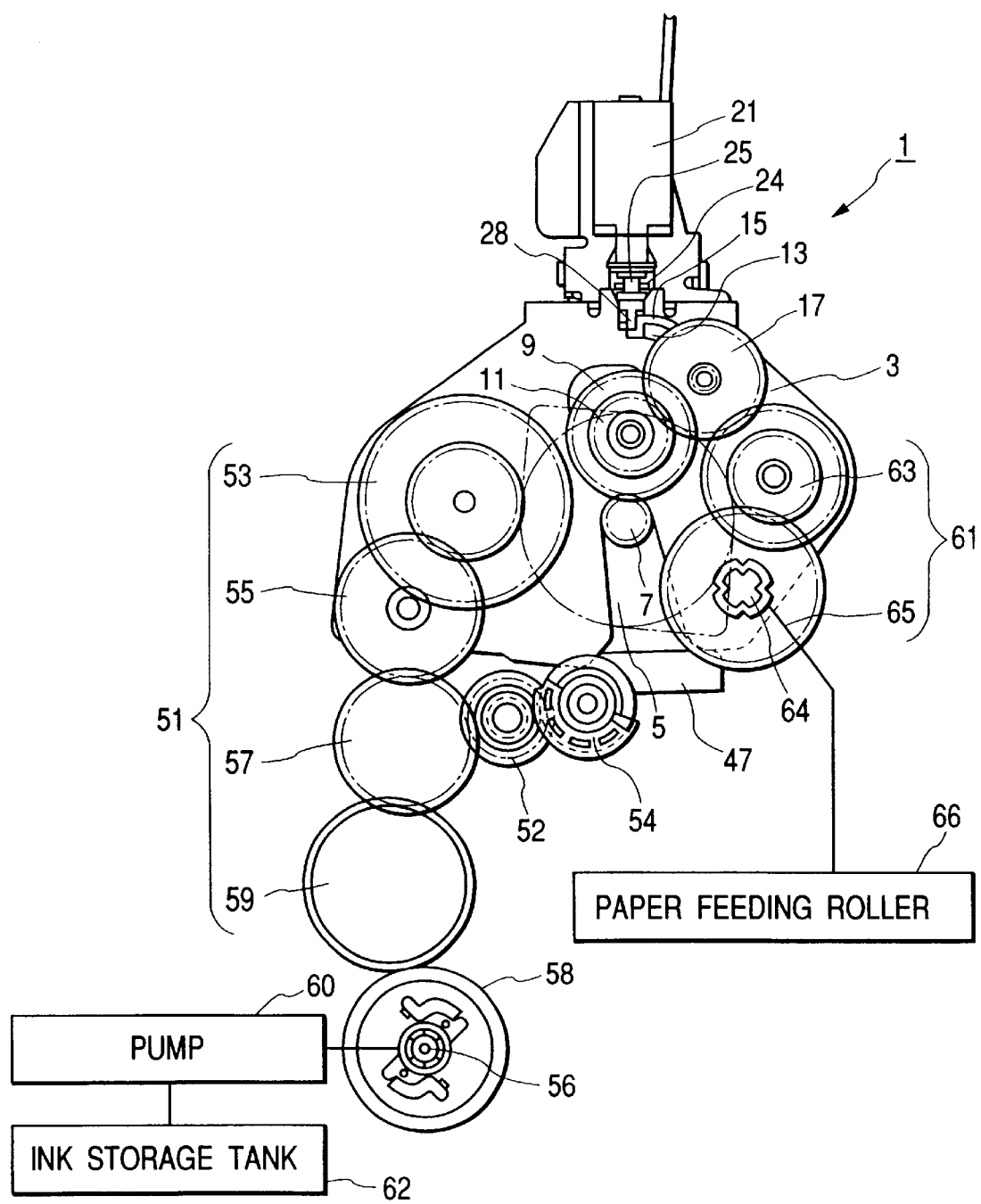
FIG. 2 is a front view showing a state that the power transmission switching device according to the present invention is connected to a second drive transmission system.
Figure 3:
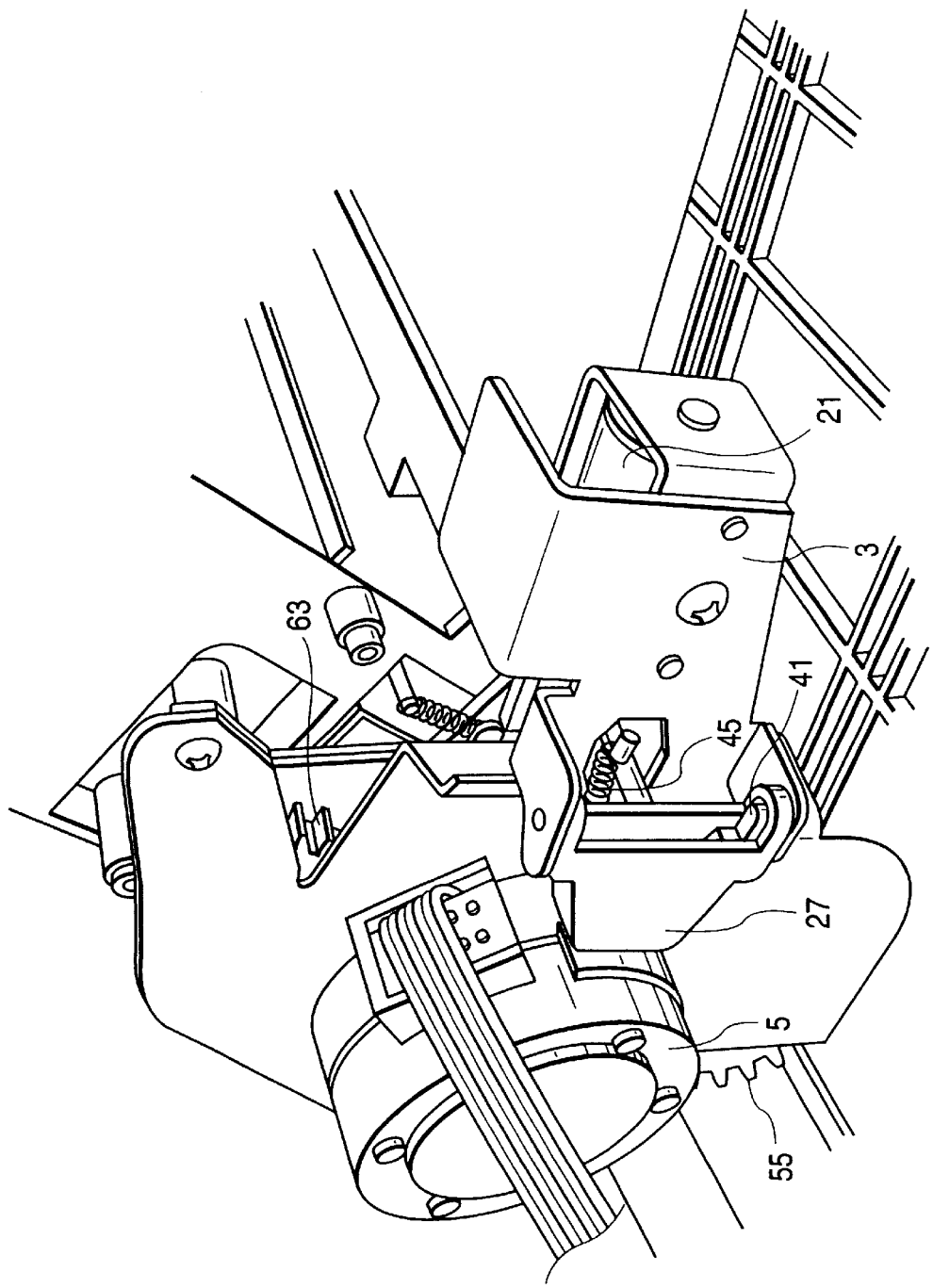
FIG. 3 is a perspective view showing the main part viewed from the side of a motor (a driving source) in a state that the power transmission switching device is built in an ink-jet printer which is a recording apparatus.
Figure 4:
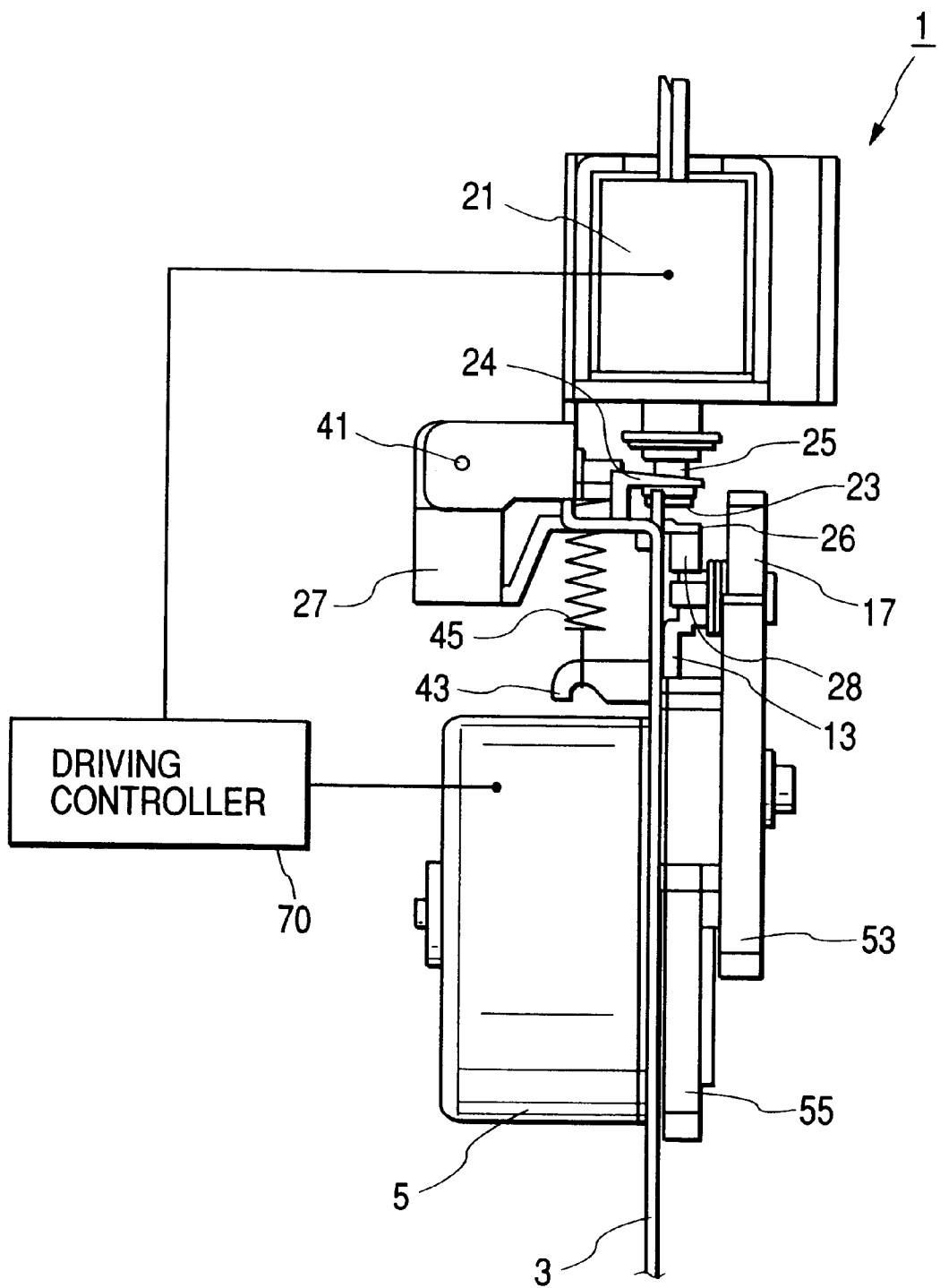
FIG. 4 is a side view showing the main part viewed from the side of the first drive transmission system of the power transmission switching device according to the present invention and shows a state that a fitting projection is fitted into a fitting cut-out.
Figure 5:
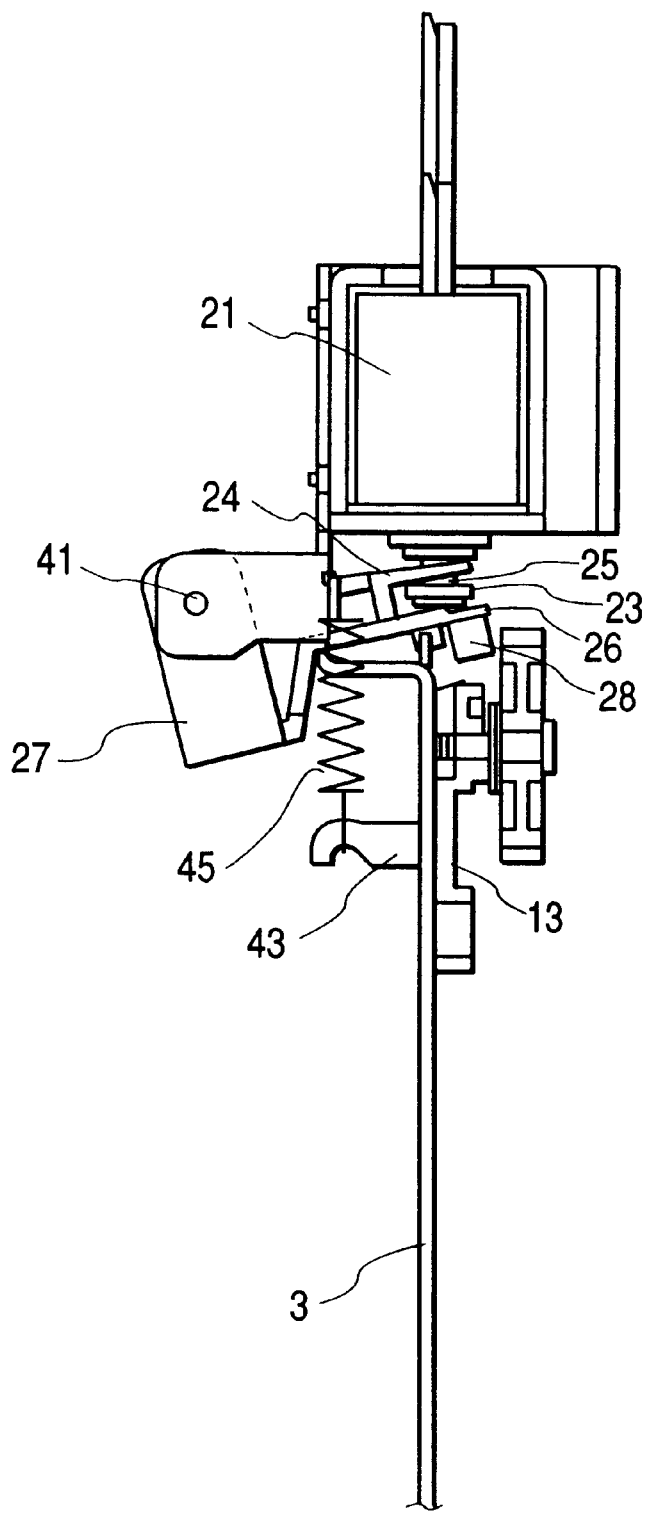
FIG. 5 is a side view showing the main part viewed from the side of the first drive transmission system of the power transmission switching device according to the present invention and shows a state that a triggering solenoid is operated and the lock by the fitting projection is released.
Figure 6:
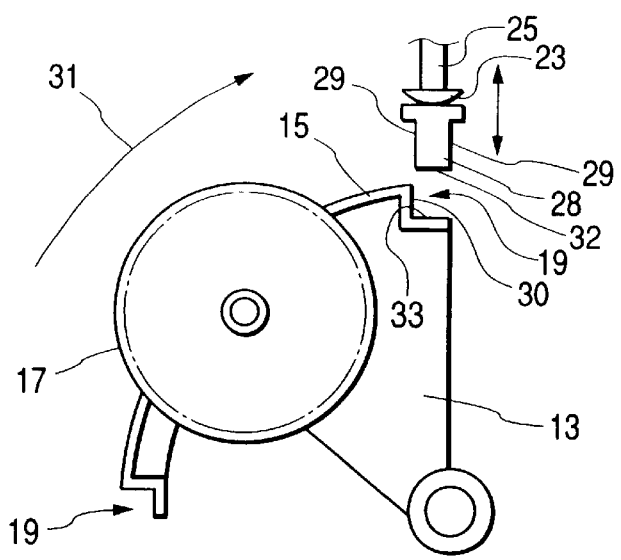
FIG. 6 is a front view showing a state that a rocking lever is located on the side of the first drive transmission system before the fitting part is fitted into the fitting cut-out.
Figure 7:
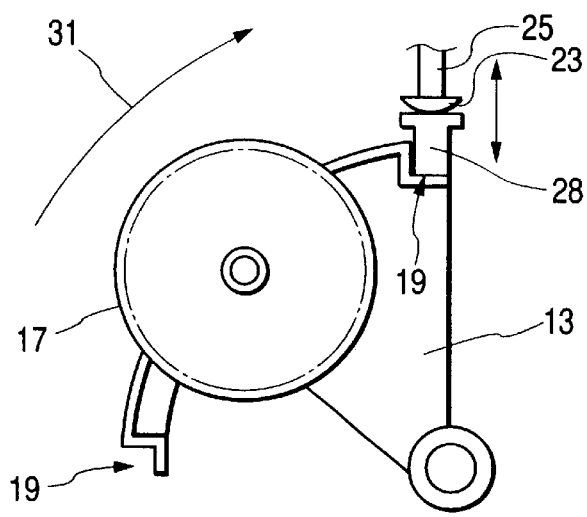
FIG. 7 is a front view showing a state that a rocking lever is located on the side of the first drive transmission system and the fitting part is fitted into the fitting cut-out.

Referring to the drawings, embodiments of the present invention will be described below. FIG. 1 is a front view showing a part of a drive transmission system in which a power transmission switching device 1 equivalent to an embodiment of the present invention is built, FIG. 2 is a front view showing a state that the power transmission switching device according to the present invention is connected to a second drive transmission system, FIG. 3 is a perspective view showing the main part viewed from the side of a motor (a driving source) in a state that the above power transmission switching device is built in an ink-jet printer which is a recording apparatus, FIG. 4 is a side view viewed from the side of a first drive transmission system of the power transmission switching device according to the present invention and shows a state that a fitting projection is fitted into a fitting cut-out. FIG. 5 is a side view viewed from the side of the first drive transmission system of the power transmission switching device according to the present invention and shows a state that a triggering solenoid is operated and lock by the fitting projection is released. FIG. 6 shows a state immediately before the fitting projection is fitted into the fitting cut-out that a rocking lever is located on the side of the first drive transmission system, FIG. 7 shows a state that the rocking lever is located on the side of the first drive transmission system and the fitting projection is fitted into the fitting cut-out and FIG. 8 shows another embodiment of a fitted part.

As shown in FIGS. 1 and 2, the power transmission switching device 1 is united by assembling various members on a base plate 3. That is, a motor 5 as a power source shown by an alternate long and short dash line in FIGS. 1 and 2 is attached in the center on the back side of the base plate 3. A pinion 7 is attached to the output shaft of the motor 5 and a sun gear 9 is engaged with the pinion 7 in this embodiment. The sun gear 9 is attached onto the base plate 3 and inside it, an inside gear 11 is integrated.

A rocking lever 13 having a rocking shaft common to the rotating shaft of the sun gear 9 is attached between the sun gear 9 and the base plate 3. A planet gear 17 is attached in the vicinity of the peripheral margin 15 of the rocking lever 13 and is engaged with the above inside gear 11. The rocking lever 13 is shaped like a fan having a central angle of approximately 90° in this embodiment and a fitting cut-out 19 cut out approximately in the shape of a hook is formed at both ends of the peripheral margin 15. The peripheral margin 15 of the rocking lever 13 is arc-shaped and in addition, the cross section is formed so that it has a roundish convex shape.

Figure 8:
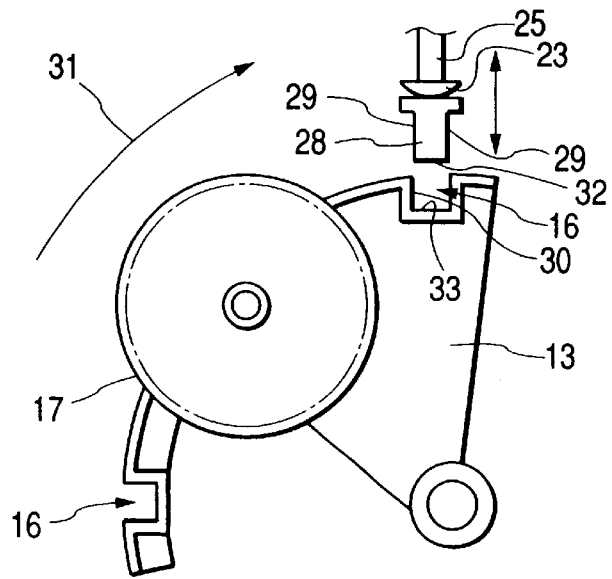
FIG. 8 is a front view showing another embodiment of the fitted part.

In this embodiment, a fitted part is formed by cutting out both ends of the rocking lever 13, however, as shown in FIG. 8, a concave fitted part 16 may be also formed in a halfway part of the peripheral margin of the rocking lever 13 or a fitted part may be also formed by protruding from the surface of the rocking lever 13 so that the above fitted part is fitted to a fitting part described later though the fitting part is not shown.

In the meantime, a triggering solenoid 21 which is one element of locking means for locking the rocking lever 13 in the position is attached to the upper part of the base plate 3 and a plunger 25 at the end of which a contact part 23 shown in FIGS. 6 and 7 is formed is provided on the side of the lower end of the triggering solenoid 21. The plunger 25 is drawn back when the switch of the triggering solenoid 21 is turned on. As shown in FIGS. 4 and 5, a triggering lever 27 is provided at the back of the plunger 25 and an upper projection 24 and a lower projection 26 are formed on the front end side of the triggering lever 27 so that they respectively hold the contact part 23 of the plunger 25 from the upper part and the lower part. A fitting part 28 having such a shape as is fitted into the fitting cut-out 19 of the rocking lever 13 is formed on the lower side of the lower projection 26 as one element of the above locking means.

As shown in FIGS. 6 and 7, a flat side 29 is formed on both sides of the fitting part 28 and when the fitting part 28 is fitted into the fitting cut-out 19, the whole surface of the above side 29 comes in contact with each side 30 of the fitting cut-out 19. Hereby, as the whole side of the fitting part 28 can receive the above force even if such force as rocks the rocking lever 13 in a direction shown by an arrow 31 is applied to the rocking lever when the fitting part 28 is fitted into the fitting cut-out 19, the rock of the rocking lever 13 can be securely provided.

As shown in FIGS. 6 and 7, the lower surface 32 of the fitting part 28 is flat and when the fitting part 28 is fitted into the fitting cut-out 19, the whole lower surface 32 comes in contact with the receiving surface 33 of the fitting cut-out 19. Hereby, as shown in FIG. 7, when the fitting part 28 is fitted into the fitting cut-out 19, the fitting part 28 is tightly fitted into the fitting cut-out 19 and is steady in the fitting cut-out 19. Hereby, the rocking lever 13 can be securely fixed.

Also, as described above, as the peripheral margin 15 of the rocking lever 13 is arc-shaped and the cross section is roundish convex-shaped, frictional force between the rocking lever 13 and the lower surface 32 of the fitting part 28 is minimum when the lower surface 32 of the fitting part 28 is in contact with the periphery margin 15 of the rocking lever 13 and the rocking lever 13 can be smoothly rocked. The need for the fitting part 28 which is one element of the above locking means will be described later.

Next, as shown in FIGS. 3 to 5, the triggering lever 27 is supported so that it can be turned upward and downward with a fulcrum 41 in the center and is always pressed downward in FIG. 4 by the action of a helical spring 45 connected between a spring fitting part 43 of the base plate 3 and the triggering lever 7.

As the above structure is provided, the planet gear 17 can be selectively connected to a first drive transmission system 51 and a second drive transmission system 61 respectively provided to the right and the left of the base plate 3 with the pinion 7 of the motor in the center when the rocking lever 13 is rocked (rolled) right or left. In this embodiment, both drive transmission systems 51 and 61 are connected to a drive unit in a printer. These drive transmission systems 51 and 61 will be described below.

First, the first drive transmission system 51 provided to the left side of the base plate 3 is connected to a pump 60 which is a driving system for discharging ink from an ink storage tank 62 for jetting power recovery operation such as so-called flushing. That is, in an ink-jet printer, operation for jetting ink into the ink storage tank 62 is executed every fixed time for a purpose other than printing to maintain ink jetting precision in continuous printing. Ink in the ink storage tank 62 is required to be discharged by the pump 60 before the ink in the tank overflows. The first drive transmission system is a system for transmitting driving force for driving such a pump 60 for discharging ink.

As shown in FIGS. 1 and 2, the first drive transmission system 51 is provided with a pump transmission gear 53 which can be engaged with the planet gear 17 (a first drive transmission gear in the first drive transmission system 51), a first intermediate gear 55 engaged with the above pump transmission gear 53, the succeeding second intermediate gear 57 and a third intermediate gear 59. The pump transmission gear 53 and the first intermediate gear 55 of them are united as a part of the power transmission switching device 1 and are assembled on the base plate 3. Also, as shown in FIGS. 1 and 2, the first drive transmission system 51 is formed so that power can be transmitted from the second intermediate gear 57 to a carriage locking lever 47 via two gears 52 and 54, and the lock and the release of a carriage can be switched.

In the meantime, the second drive transmission system 61 is provided to the right side of the base plate 3 for driving a paper feeding roller 66 and is provided with a transmission gear 63 for an automatic self feeder (ASF) (a first drive transmission gear of the second drive transmission system) which can be engaged with the planet gear 17 and an ASF driving gear 65 engaged with the above gear. The ASF driving gear 65 is provided to the shaft 64 of the paper feeding roller. The ASF transmission gear 63 is attached to the base plate 3 as a part of the power transmission switching device 1 and is united.

As the pump for discharging ink 60 and the paper feeding roller 66 respectively connected to these first and second drive transmission systems 51 and 61 both require both normal and reverse driving, the motor 5, the first and second drive transmission systems 51 and 61 are required to be respectively a mechanism that transmits normal and reverse rotation. In the present invention, the fitting part 28 which is one element of the locking means plays the role.

That is, if the sun gear 9 is rotated counterclockwise in case the planet gear 17 is engaged with the pump transmission gear 53 as shown in FIG. 1, the planet gear 17 receives force that revolves counterclockwise around the sun gear 9 and tries to be always engaged with the pump transmission gear 53. However, conversely, if the sun gear 9 is rotated clockwise when the planet gear 17 is engaged with the pump transmission gear 53, the planet gear 17 receives force that revolves clockwise around the sun gear 9 and tries to separate from the pump transmission gear 53. If driving transmission is continued in such a state, engagement between gears is deteriorated and a situation that all teeth are not engaged is caused. In the latter case, secure engagement between the planet gear 17 and the pump transmission gear 53 is enabled by locking the rocking lever 13 so that the fitting part 28 is fitted into the fitting cut-out 19 on the right side of the rocking lever 13 and the rocking lever cannot be rocked. As described above, the above locked state of the rocking lever 13 becomes securer by forming the flat side 29 on both sides of the fitting part 28, also flattening the lower surface 32 and tightly fitting the fitting part 28 into the fitting cut-out 19.

Also similarly, if the sun gear 9 is rotated counterclockwise when the planet gear 17 is engaged with the ASF transmission gear 63, the planet gear 17 receives force that revolves counterclockwise around the sun gear 9 and tries to separate from the ASF gear 63 and therefore, the fitting part 28 is fitted into the fitting cut-out 19 on the left side of the rocking lever 13 to lock so that the rocking lever 13 cannot be rocked.

Figure 9:
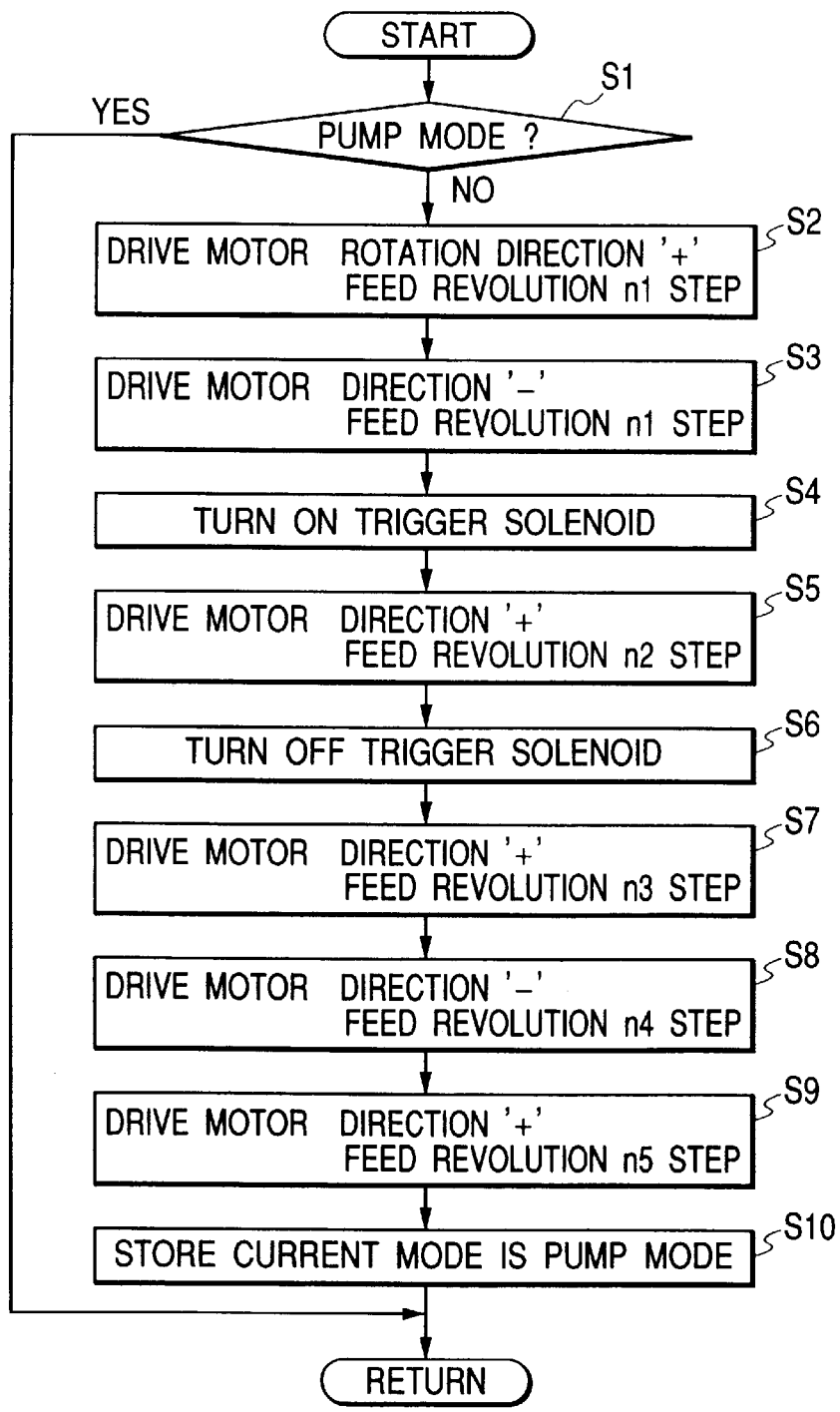
FIG. 9 is a flowchart for explaining the initial operation of operational control in a first embodiment.

Referring to a flowchart showing one example of its operational control in FIGS. 9 and 10, an example in which the power transmission switching device 1 equivalent to the above embodiment is applied to an ink-jet printer 68 will be described below. The first drive transmission system 51 is a driving system for driving the above pump for discharging ink composed of a tube pump 60 and the second drive transmission system 61 is a driving system for driving the paper feeding roller 68. Operational control shown in these flowcharts is executed by a driving controller 70 shown in FIG. 4. The driving controller 70 normally and reversely rotates the paper feeding roller 6 based upon print data sent from an external computer and others, printing execution time and others measured by the printer itself and switches from a state that power is transmitted to the paper feeding roller 66 to a state that power is transmitted to the pump for discharging ink 60 to drive the pump 60.

In this embodiment, the rocking lever 13 is controlled in an initial state in any case so that it is connected to the side of the first drive transmission system 51, that is, to the side of the pump for discharging ink 60. As shown in FIG. 9, when the printer is powered on, it is checked in a memory (EEPROM) not shown in the driving controller 70 whether a pump mode is on or not, that is, whether the rocking lever 13 is located on the pump driving side or not in a step S1. The memory is composed so that the information of whether the rocking lever 13 is in a pump mode or not when the printer is powered off last time is written.

If the answer of the question in the step S1 is No, the rocking lever 13 is normally located on the side of the second drive transmission system 61. Then, initial operation for moving the rocking lever 13 to the side of the first drive transmission system 51 is executed. As in this operation, the fitting part 28 is fitted into the fitting cut-out 19 on the left side of the rocking lever 13, first, the motor 5 is rotated by +n1 steps (+5 steps) in a step S2 so that force for moving the rocking lever 13 to the side of the pump transmission gear 53 acts to avoid the engagement with the fitting cut-out 19 of the fitting part 28. As described above, if the motor 5 is rotated in the above direction, the rotation is represented by '+' and if the motor is rotated in the reverse direction, the rotation is represented by '−'.

Next, the motor is rotated by −n1 steps (−5 steps) in a step S3 so that the rocking lever 13 is driven to the side of the ASF transmission gear 63. The triggering solenoid 21 is turned on a little later and the lock of the rocking lever 13 is released in a step S4.

Next, after a little waiting time, the motor 5 is driven and is rotated by +n2 steps (+65 steps) and the rocking lever 13 is rocked to the side of the pump transmission gear to engage the planet gear 17 with the pump transmission gear 53 in a step S5. In this state, the triggering solenoid 21 is turned off, the fitting part 28 is fitted into the fitting cut-out 19 by the action of the helical spring 45 and the rocking lever 13 is locked in a step S6. In this state, substantial movement to the side of the pump transmission gear is finished. At this time, the side 29 of the fitting part 28 comes in contact with the side 30 of the fitting cut-out 19, the whole lower surface 32 of the fitting part 28 comes in contact with the receiving surface 33 of the fitting cut-out 19 and lock is secured.

In this embodiment, afterward, further after a little waiting time, to secure engagement between the planet gear 17 and the pump transmission gear 53, the motor is further rotated by +n3 steps (+15 steps) in the same direction in a step S7.

Next, the motor is driven in a direction in which the rocking lever 13 is moved to the side of the ASF transmission gear 63 and is rotated by −n4 steps (−110 steps) in all in a step S8. As rocking lever 13 is fixed in a locked state, the operation (−n4 steps (−110 steps)) in the step S8 drives the pump in a reverse direction to the direction in the step S7. Further, the motor is rotated by +n5 steps (+30 steps) in a step S9. Hereby, the pump is driven in a reverse direction to the direction in the step S8. It is stored in the above memory that the current mode is a pump mode. Hereby, connection to the side of the pump is completely finished.

It is described above that first, the rocking lever 13 is located on the ASF driving side and is afterward rocked to the pump driving side, however, it is also supposed that the rocking lever 13 is located on the pump driving side differently from the result of the step S1 because of any cause. In such a case, when operation for rocking to the pump driving side is further executed, sucking by the pump or the release is performed in all steps and when the motor is rotated only in one direction, a tube in a tube pump may be crushed. In the embodiment shown in FIG. 9, the total number of steps in the direction of '+' and that of steps in the direction of '−' are set so that they are equal to prevent the above problem that the tube is crushed in such a case from occurring. That is, they are set so that l+n1+n2+n3+n5l=l−n1−n4l. Hereby, even if operation for rocking to the pump driving side is further executed when the rocking lever 13 is located on the pump driving side, no problem occurs.

Figure 10:
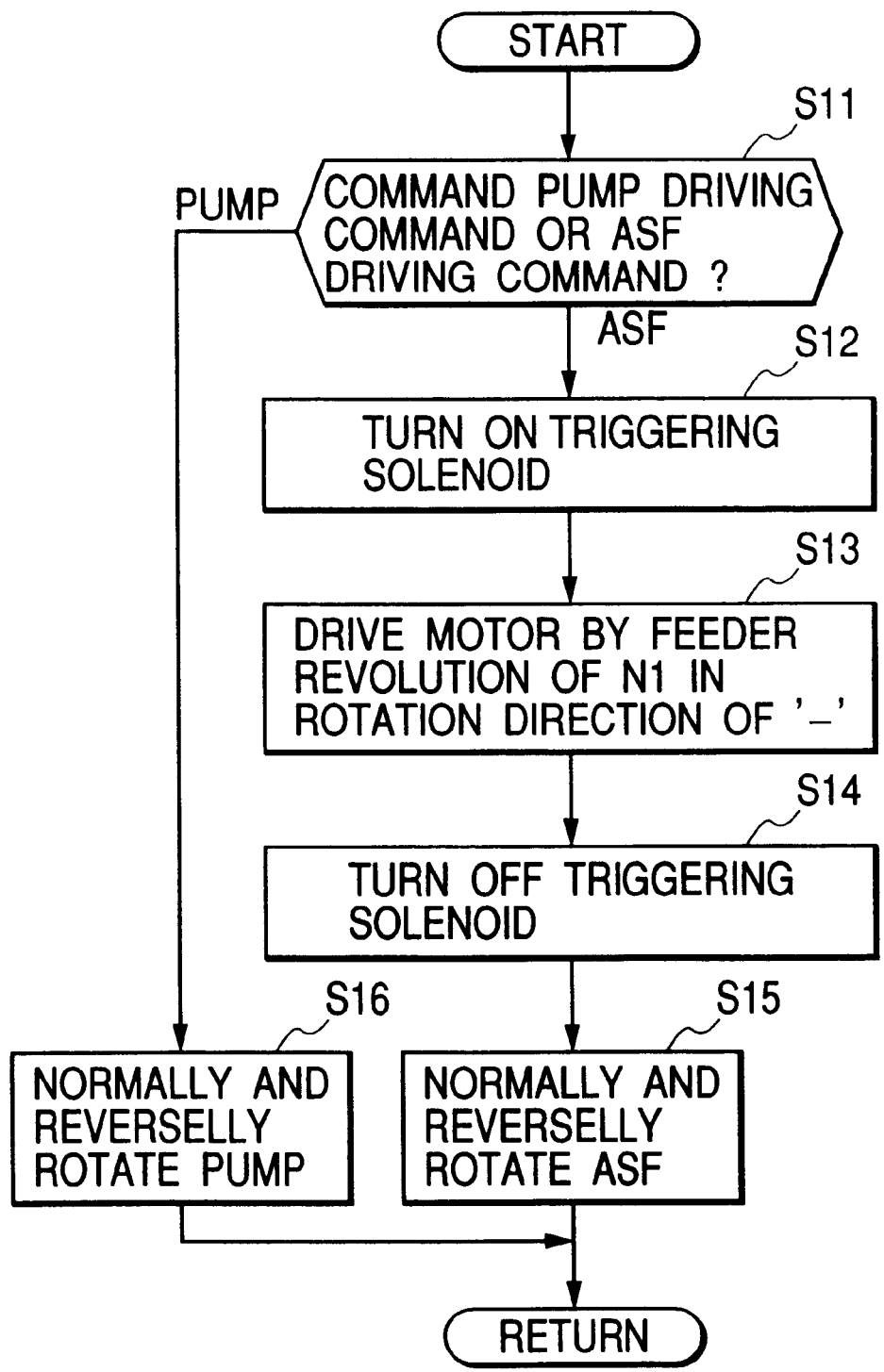
FIG. 10 is a flowchart for explaining the operational control in the first embodiment.

Afterward, as shown in FIG. 10, if the pump for discharging ink is driven, it is verified in a step S11 that the state in the step S10, that is, the current mode is a pump mode, processing proceeds to a step S16, when the motor is driven, driving force is transmitted to the pump 60 via the first drive transmission system 51 and driving in normal and reverse rotation is executed. Hereby, the sucking operation of the pump 60 and release operation in which the tube is not pressurized are executed. If the paper feeding roller 66 is driven, a step S12 is selected in the step S11, the lock of the rocking lever 13 is released, the motor is reversely rotated, the rocking lever 13 is rocked (rolled) on the right side and the planet gear 17 is engaged with the ASF transmission gear 63 in a step S13. The number N1 of steps in which the motor is driven is set so that the above switching can be securely performed. The triggering solenoid 21 is turned off, the rocking lever 13 is locked in the position in a step S14 and switching to the ASF driving side is completed. When the motor is driven in this state, ASF is driven and the paper feeding roller 66 is normally and reversely rotated. At this time, the side 29 of the fitting part 28 comes in contact with the side 30 of the fitting cut-out 19, the whole lower surface 32 of the fitting part 28 comes in contact with the receiving surface 33 of the fitting cut-out 19 and lock is secured.

Second Embodiment

Figure 11:
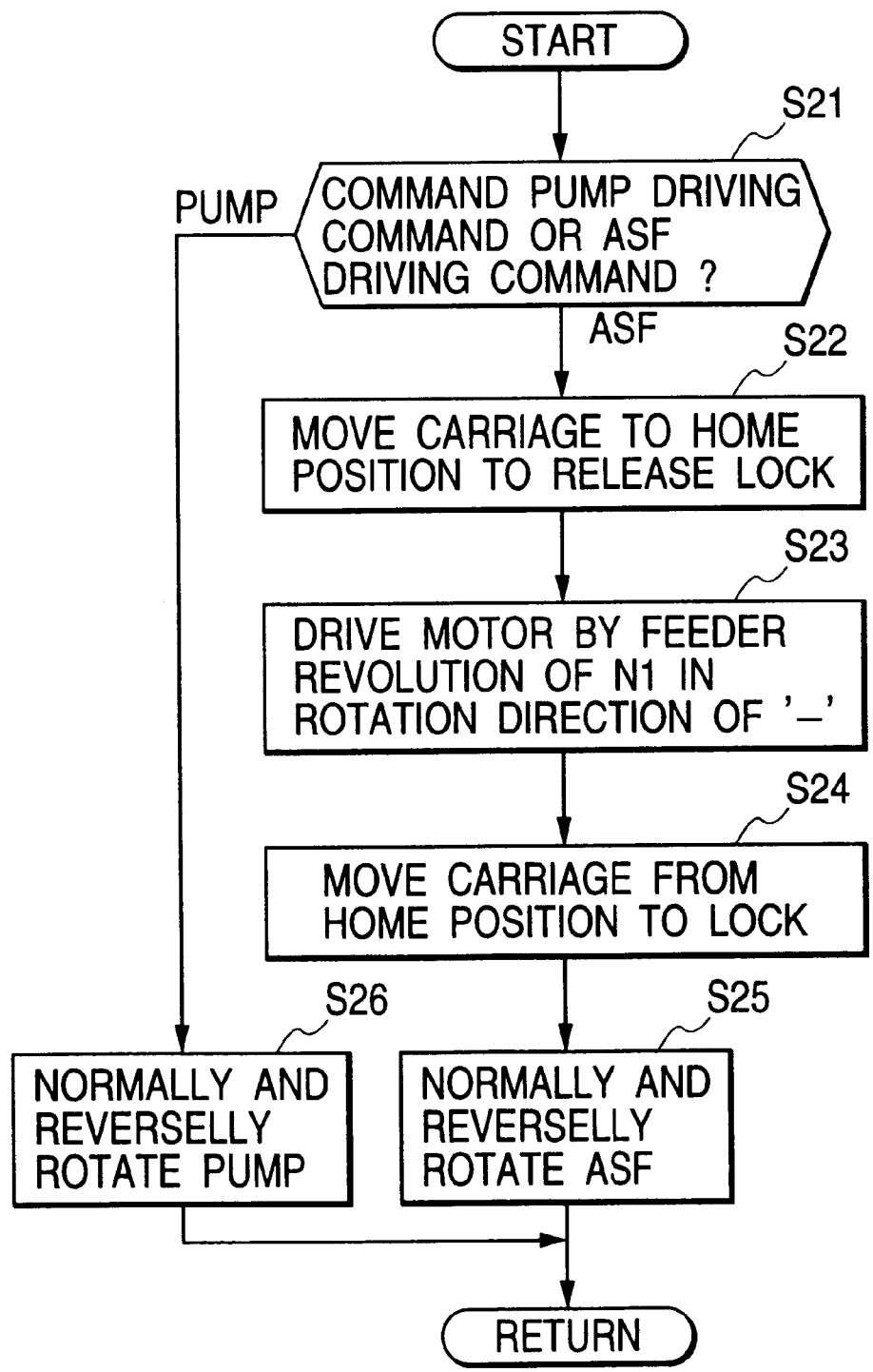
FIG. 11 is a flowchart for explaining operational control in a second embodiment.
Figure 12:
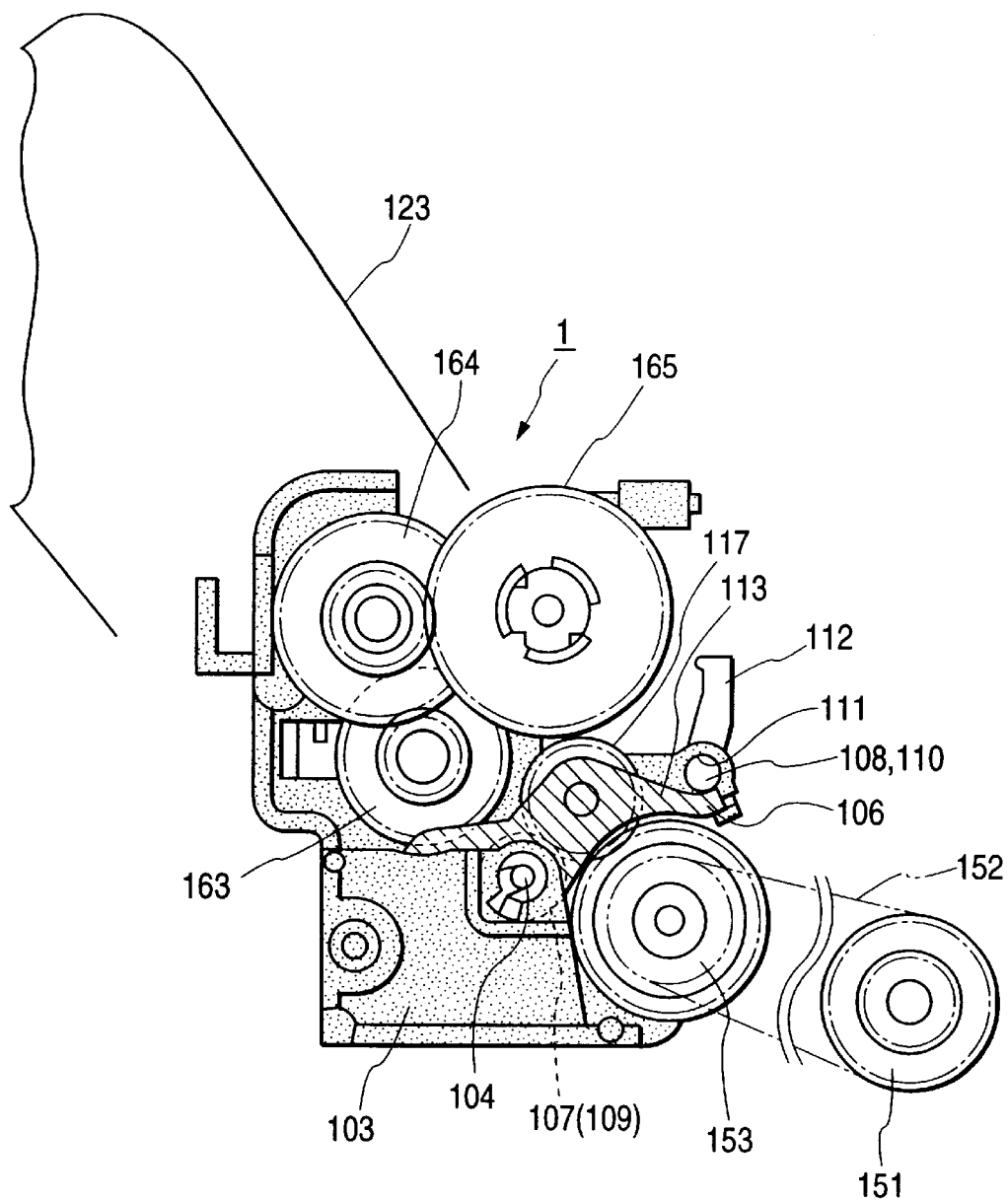
FIG. 12 is a side view showing a power transmission switching device equivalent to a second embodiment applied to a printer.

Referring to FIGS. 11 to 14, a second embodiment of the present invention will be described below. The second embodiment is greatly different from the first embodiment in that the lock and the release of a rocking lever are performed utilizing the movement of the carriage of the printer to a position in readiness (a home position (HP)) without using the triggering solenoid 21. In this embodiment, as shown in FIG. 12, various members of a power transmission switching device 1 are also assembled on a base plate 103 made of plastic and are united.

Figure 13:
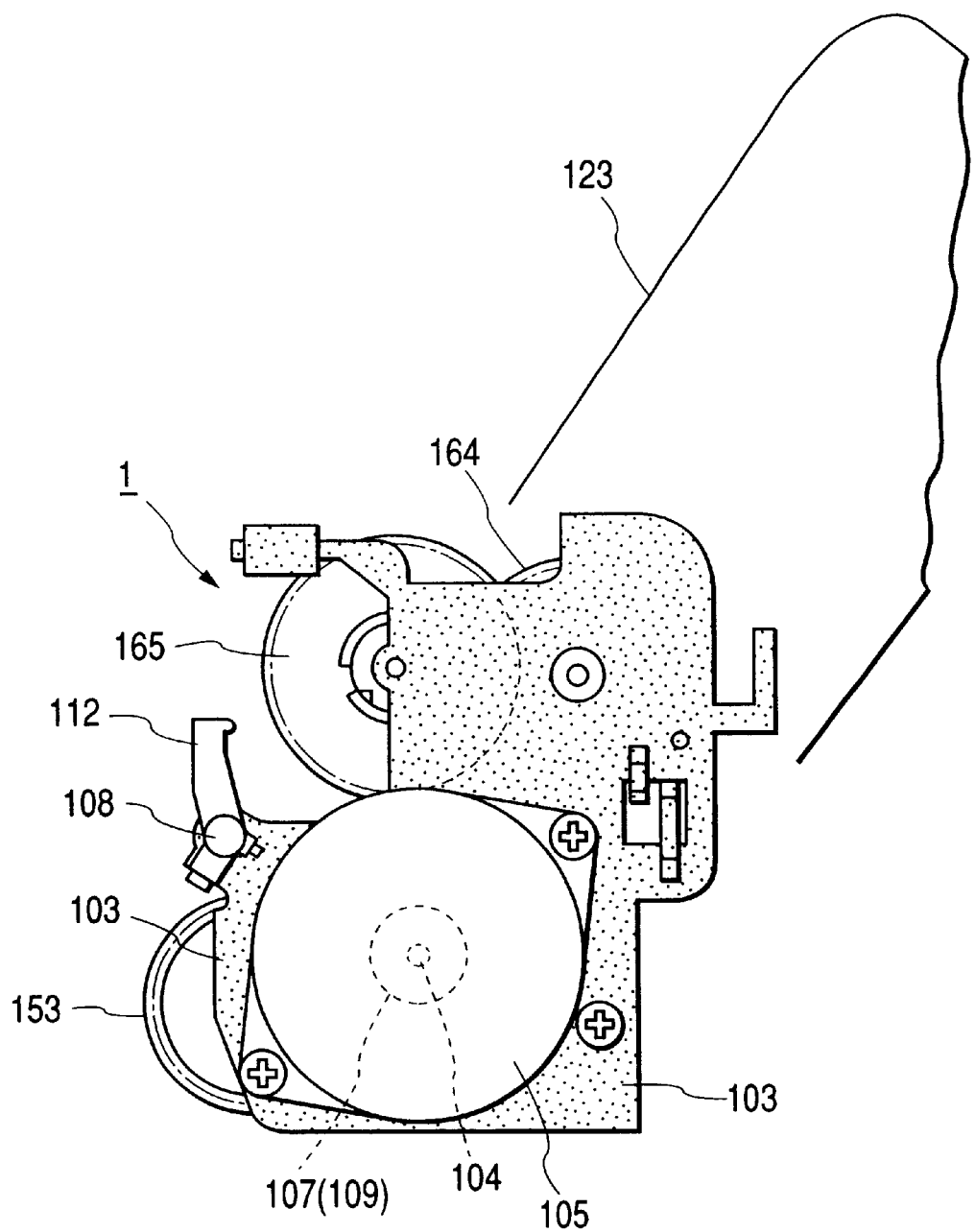
FIG. 13 is a side view viewed from the reverse side to the side shown in FIG. 12 showing the power transmission switching device equivalent to the second embodiment applied to the ink-jet printer.

A motor 105 as a power source is attached to the center of the base plate 103 as shown in FIG. 13. A pinion 107 is attached to the output shaft 104 of the motor 105 and in this embodiment, the pinion 107 also functions as a sun gear 109. A rocking lever 113 shown in FIG. 12 having a rocking shaft common to the rotating shaft (the above output shaft 104) of the sun gear 109 is attached onto the base plate 103.

A planet gear 117 rolled around of the sun gear 109 is attached to the rocking lever 113. The free end of the rocking lever 113 functions as a fitting part 106 and a lock pin 108 which is rocking lever holding means as the triggering solenoid 21 is constituted so that it can be fitted to the fitting part 106 of the rocking lever 113 in a state in which the above planet gear 117 is engaged with either of a pump transmission gear (a first drive transmission gear) 153 or an ASF transmission gear (a first drive transmission gear) 163 so as to regulate the rock of the rocking lever 113.

Figure 14:
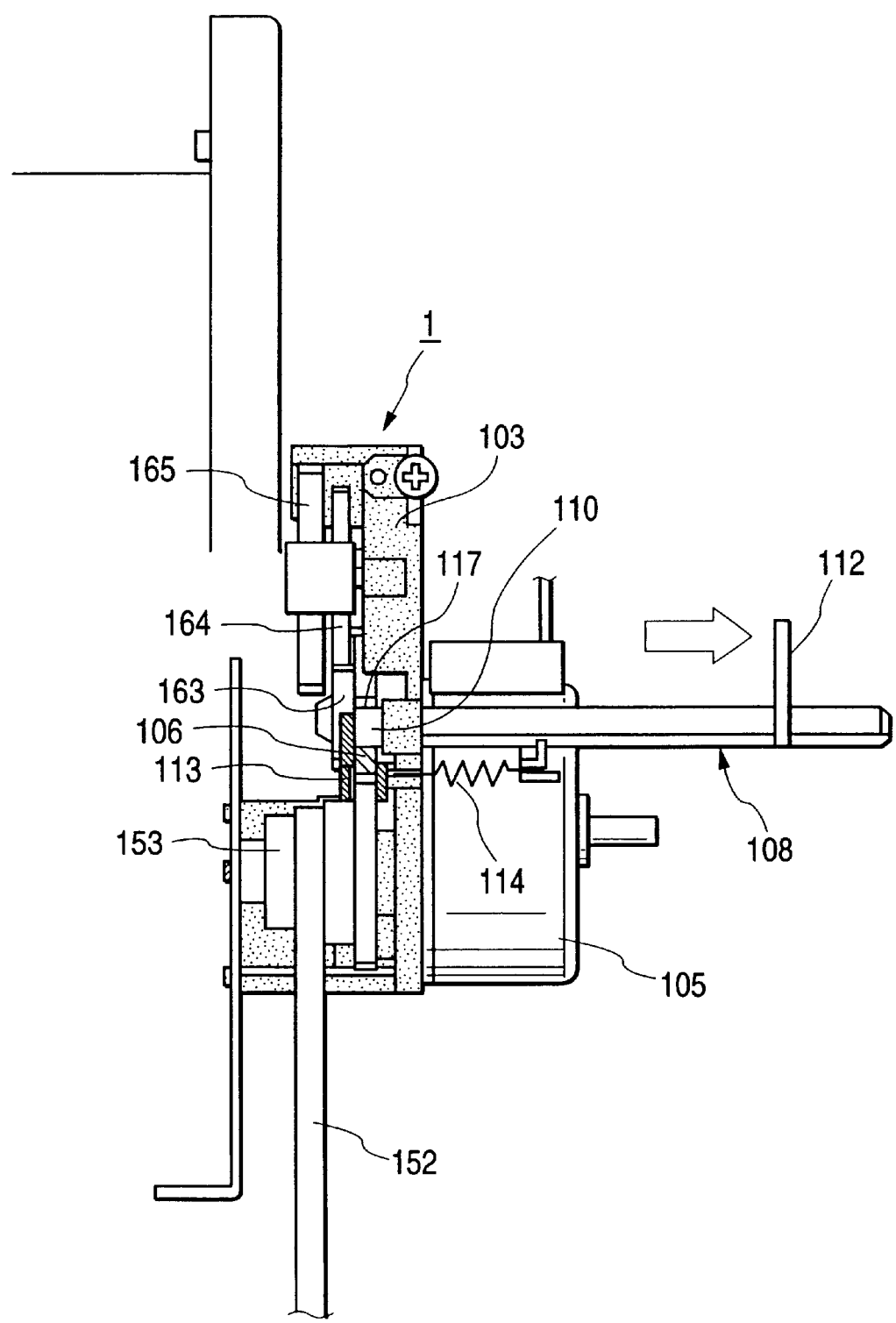
FIG. 14 is a front view showing the main part of the power transmission switching device equivalent to the second embodiment applied to the ink-jet printer.

That is, the above lock pin 108 is arranged in a part corresponding to the home position on a line on which the carriage of the printer is moved on the base plate 103. The lock pin 108 is constituted so that the rocking lever 113 is locked or the lock is released by advancing or backing one end 110 of the lock pin into a hole 111 provided to the base plate 103 in parallel with a direction in which the carriage is moved and in a direction perpendicular to a direction in which the rocking lever 113 is rocked. The above locked state of the lock pin 108 is maintained normally by making the above one end 110 pierce the above hole 11 by a spring 114 as shown in FIG. 14. A reference number 112 denotes a fitting piece, when the carriage is pressed against the fitting piece 112, the lock pin 108 is pushed back against pressure by the spring 114 and the above locked state is released. That is, the lock and the release of the lock by the lock pin 108 are performed utilizing the movement of the carriage to the home position.

As the above structure is provided, the rocking lever 113 is rocked (rolled) right and left via the pinion 107 and the sun gear 109 by the driving of the motor 105 and hereby, the planet gear 117 can be selectively connected to the pump transmission gear 153 which is the first drive transmission system and the ASF transmission gear 163 which is the second drive transmission system respectively provided to the right and the left of the base plate 103 with the pinion 107 of the motor 105 in the center. As shown in FIG. 12, a reference number 151 denotes a transmission gear on the side of a pump driving unit and 152 denotes a belt. A reference number 123 denotes a paper setting part of an automatic self feeder (ASF).

Operational control in the second embodiment is also basically similar to that in the first embodiment. FIG. 11 is a flowchart in the second embodiment equivalent to the flowchart in the first embodiment shown in FIG. 10 and steps S21 to S26 correspond to the steps S11 to S16 shown in FIG. 10. Of them, the steps S22 and S24 are different in that the lock pin 108 driven utilizing the movement of the carriage to the home position (HP) is used, however, they are essentially not different in basic control that the rocking lever 113 is locked in each position and the lock is released.

According to this embodiment, driving force from a driving source can be selectively transmitted to the first drive transmission system and the second drive transmission system by rocking (rolling) the planet gear between the first drive transmission gear of the first drive transmission system and the first drive transmission gear of the second drive transmission system. The planet gear is never separated from the first drive transmission gear of each drive transmission system by locking the rocking lever by the locking means of the rocking lever or rocking lever holding means even if the planet gear is rotated clockwise and counterclockwise.

As the above locking means is advanced or backed on a locus on which the rocking lever is rocked and regulates the above roll of the planet gear, the structure is simplified and unnecessary roll can be securely prevented in a state in which the planet gear is engaged with either of the above two drive transmission gears. Hereby, even if the first drive transmission system and the second drive transmission system are connected to a drive unit normally and reversely rotated, gears are prevented from being separated and a situation that all teeth are not engaged is prevented from occurring.

The whole flat side of the above locking means comes in contact with the flat side of the fitted part and the rocking lever can be securely locked. The locking means is fitted into the fitted part by making the lower surface of the locking means flat and enabling contact between the surface of the fitted part and the above flat lower surface and securer lock can be realized.

Also, the flat, compact and reliable power transmission switching device the structure of which is relatively simple can be provided by adopting configuration that the planet gear is attached to the rockable rocking lever and the two drive transmission systems are selectively switched.

Further, as the whole switching device can be flattened by adopting the above configuration, the power transmission switching device can be united. Therefore, assembly work is completed in a short time only by assembling the united switching device as it is.

What is claimed is:

1. A power transmission switching device provided with a mechanism that two drive transmission systems connected to one driving source are selectively switched, comprising:
    a first drive transmission gear of a first drive transmission system;
    a first drive transmission gear of a second drive transmission system;
    a rocking lever which can be rocked between the first drive transmission gear of said first drive transmission system and the first drive transmission gear of said second drive transmission system, said rocking lever having a fitting cut-out;
    a planet gear attached to said rocking lever, located between said both drive transmission gears, selectively engaged with said both drive transmission gears by the rock of said rocking lever for transmitting driving force from said driving source; and
    a locking device for locking said rocking lever in a state that said planet gear is engaged with either of said two drive transmission gears, said locking device comprising:
        a plunger; and
        a fitting part contacted by the plunger for insertion into the fitting cut-out of the rocking lever,
    wherein the first drive transmission gear of said first drive transmission system and the first drive transmission gear of said second drive transmission system are located on both sides of the drive shaft of said driving source, and said first and second drive transmission systems are connected to a drive unit normally and reversely rotated.

2. A power transmission switching device according to claim 1, wherein said rocking lever is supported by a shaft which is the same or parallel as/to said drive shaft so that the rocking lever can be rocked and has a part of a circumference as its peripheral margin, and said locking device can be fitted into a part of the peripheral margin of said rocking lever to regulate the rock of said rocking lever in a state that said planet gear is engaged with either of said two drive transmission gears.

3. A power transmission switching device according to claim 1, wherein said rocking lever is supported by a shaft which is the same or parallel as/to said drive shaft so that the rocking lever can be rocked and its free end is formed as the fitted part, and said fitting part can be fitted into said fitted part to regulate the rock of said rocking lever in a state that said planet gear is engaged with either of said two drive transmission gears.

4. A power transmission switching device according to claim 1, further comprising:
    a sun gear engaged with the drive shaft of said driving source,
    wherein said planet gear revolves around a part of the periphery of said sun gear.

5. A power transmission switching device according to claim 1, wherein said first drive transmission system is connected to a pump for discharging ink from an ink storage tank for jetting power recovery operation of an ink-jet printer.

6. A power transmission switching device according to claim 1, wherein said second drive transmission system is connected to a paper feeding roller of a printer.

7. A power transmission switching device according to claim 1, wherein said driving source, at least the first drive transmission gear of said first drive transmission system, at least the first drive transmission gear of said second drive transmission system, said rocking lever, said planet gear and said locking device are united.

8. A power transmission switching device provided with a mechanism that two drive transmission systems connected to one driving source are selectively switched, comprising:
    a first drive transmission gear of a first drive transmission system;
    a first drive transmission gear of a second drive transmission system;
    a rocking lever which can be rocked between the first drive transmission gear of said first drive transmission system and the first drive transmission gear of said second drive transmission system;
    a planet gear attached to said rocking lever, located between said both drive transmission gears, rolled on a locus between said both drive transmission gears and selectively engaged with said both drive transmission gears by the rock of said rocking lever for transmitting driving force from said driving source; and
    a rocking lever holding device that is advanced and backed on a locus on which said rocking lever is rocked to regulate the roll of said planet gear in a state that said planet gear is engaged with either of said two drive transmission gears, said rocking lever holding device comprising a lock pin for locking and releasing the rocking lever based on movement of a carriage, wherein the first drive transmission gear of said first drive transmission system and the first drive transmission gear of said second drive transmission system are located on both sides of the drive shaft of said driving source, and said first and second drive transmission systems are connected to a drive unit normally and reversely rotated.

9. A rocking lever locking device in a power transmission switching device, comprising:
one driving source;
a mechanism for selectively switching two first and second drive transmission systems connected to said driving source;
a first drive transmission gear of a first drive transmission system;
a first drive transmission gear of a second drive transmission system;
a rocking lever which can be rocked between the first drive transmission gear of said first drive transmission system and the first drive transmission gear of said second drive transmission system, said rocking lever having a fitted part;
a planet gear attached to said rocking lever, located between said both drive transmission gears, rolled on a locus between said both drive transmission gears by the rock of said rocking lever and selectively engaged with said both drive transmission gears for transmitting driving force from said driving source; and
a locking device for regulating the roll of said rocking lever in a state that said planet gear is engaged with either of said two drive transmission gears, said locking device comprising:
a plunger; and
a fitting part contacted by the plunger for insertion into the fitted part of the rocking lever,
wherein the first drive transmission gear of said first drive transmission system and the first drive transmission gear of said second drive transmission system are located on both sides of the drive shaft of said driving source, said locking device is advanced or backed on a locus on which said rocking lever is rocked and regulates the roll of said planet gear, and said first and second drive transmission systems are connected to a drive unit normally and reversely rotated.

10. A rocking lever locking device in a power transmission switching device according to claim 9, wherein a first flat side is formed in the fitting part fitted into said fitted part of said rocking lever, and a second flat side which can come in contact with said first flat side is formed in the fitted part of said rocking lever.

11. A rocking lever locking device in a power transmission switching device according to claim 10, wherein each fitted part is formed at both ends of the peripheral margin of said rocking lever, and two opposite flat sides which can come in contact with the flat side of said fitted part are formed in the fitting part of said locking means.

12. A rocking lever locking device in a power transmission switching device according to claim 10, wherein a flat lower surface is formed in the fitting part of said locking means, and a fitted surface which can come in contact with the lower surface of said fitting part is formed in said fitted part.

13. A rocking lever locking device in a power transmission switching device according to claim 10, wherein said rocking lever is supported by a shaft which is the same or parallel as/to said drive shaft so that the rocking lever can be rocked, and the peripheral margin of said rocking lever is formed in the shape of an arc.

14. A rocking lever locking device in a power transmission switching device according to claim 10, wherein said fitting part of said locking device is always pressed on the side of said fitted part, and the release of the fitting of said fitting part from said fitted part is operated by a solenoid.

15. A rocking lever locking device in a power transmission switching device according to claim 9, wherein said rocking lever is supported by a shaft which is the same or parallel as/to said drive shaft so that the rocking lever can be rocked and its free end is formed as the fitted part, and said fitting part can be fitted into said fitted part to regulate the rock of said rocking lever in a state that said planet gear is engaged with either of said two drive transmission gears.

16. A rocking lever locking device in a power transmission switching device according to claim 15, wherein said locking means is provided with a lock pin which can be advanced and backed in a direction perpendicular to a direction in which said rocking lever is rocked by external force, and the roll of said rocking lever is regulated by said advance and backing of said lock pin in a state that said planet gear is engaged with either of said two drive transmission gears.

17. A recording apparatus provided with a power transmission switching device for individually driving two driven systems by one driving source, said power transmission switching device comprising:
a first drive transmission gear of a first drive transmission system;
a first drive transmission gear of a second drive transmission system;
a switching member which can be rocked between the first drive transmission gear of said first drive transmission system and the first drive transmission gear of said second drive transmission system, said switching member having at least one fitted part;
a rocking gear attached to said switching member, located between said both drive transmission gears and individually engaged with said first and second drive transmission gears by the rock of said switching member for transmitting driving force from said driving source; and
a locking device for locking said switching member in a state that said rocking gear is engaged with either of said first and second drive transmission gears, said locking device comprising:
a plunger; and
a fitting part contacted by the plunger for insertion into the fitted part of the switching member,
wherein the first drive transmission gear of said first drive transmission system and the first drive transmission gear of said second drive transmission system are located on both sides of the drive shaft of said driving source, and said first and second drive transmission systems are respectively connected to two driven units normally and reversely rotated.

18. A recording apparatus according to claim 17, wherein said switching member can be rocked using the base on the side of said drive shaft as a fulcrum and has a part of a circumference as its peripheral margin, and said locking device can be fitted into a part of the peripheral margin of said switching member.

19. A recording apparatus according to claim 17, wherein said power transmission switching device is provided with a sun gear engaged with the drive shaft of said driving source, and said rocking gear is a planet gear revolved around a part of the periphery of said sun gear.

20. A recording apparatus according to claim 17, wherein said first drive transmission system is connected to a pump for discharging ink from an ink storage tank for jetting power recovery operation of an ink-jet printer.

21. A recording apparatus according to claim 17, wherein said second drive transmission system is connected to a paper feeding roller for sequentially feeding paper set in the paper feeding part of a printer in a direction of a recording head.

22. A recording apparatus according to claim 17, wherein at least one flat side is formed in said fitting part and a flat side which can come in contact with the flat side of said fitting part is formed in the fitted part of said switching member.

23. A recording apparatus according to claim 22, wherein each fitted part is formed at both ends of the peripheral margin of said switching member, and two opposite flat sides which can come in contact with the flat side of each fitted part are formed in said fitting part.

24. A recording apparatus according to claim 22, wherein a flat lower surface is formed in said fitting part, and a fitted surface which can come in contact with the lower surface of said fitting part is formed in said fitted part.

25. A recording apparatus according to claim 22, wherein said fitting part is always pressed on the side of said fitted part, and the release of the fitting of said fitting part from said fitted part is operated by a solenoid.

26. A recording apparatus according to claim 17, wherein said driving source, at least the first drive transmission gear of said first drive transmission system, at least the first drive transmission gear of said second drive transmission system, said switching member, said rocking gear, said sun gear and said locking device are united to be said power transmission switching device.

* * * * *